US011511886B1

(12) United States Patent
Tian

(10) Patent No.: US 11,511,886 B1
(45) Date of Patent: Nov. 29, 2022

(54) UAV TAKE-OFF AND LANDING PLATFORM

(71) Applicant: Shanghai Autoflight Co., Ltd., Kunshan (CN)

(72) Inventor: Yu Tian, Hong Kong SAR (CN)

(*) Notice: Subject to any disclaimer, the term of this patent is extended or adjusted under 35 U.S.C. 154(b) by 0 days.

(21) Appl. No.: 17/834,684

(22) Filed: Jun. 7, 2022

(30) Foreign Application Priority Data

Jun. 7, 2021 (CN) .......................... 202121258591.4

(51) Int. Cl.
*B64F 1/22* (2006.01)
*B60P 3/11* (2006.01)
*B64C 39/02* (2006.01)

(52) U.S. Cl.
CPC ..................... *B64F 1/22* (2013.01); *B60P 3/11* (2013.01); *B64C 39/024* (2013.01); *B64C 2201/18* (2013.01); *B64C 2201/208* (2013.01)

(58) Field of Classification Search
CPC . B64F 1/22; B60P 3/11; B64C 39/024; B64C 2201/18; B64C 2201/208
See application file for complete search history.

(56) References Cited

U.S. PATENT DOCUMENTS

| 10,397,495 | B1* | 8/2019 | Graber | H04N 17/002 |
|---|---|---|---|---|
| 2004/0256519 | A1* | 12/2004 | Ellis | B64F 1/02 244/110 E |
| 2008/0111021 | A1* | 5/2008 | Toth | F41F 3/07 244/63 |
| 2017/0327091 | A1* | 11/2017 | Capizzo | H02J 7/0013 |
| 2019/0369641 | A1* | 12/2019 | Gillett | G05D 1/0027 |
| 2019/0383052 | A1* | 12/2019 | Blake | G08G 5/0069 |
| 2020/0074404 | A1* | 3/2020 | Gil, Jr. | B65G 1/133 |

* cited by examiner

Primary Examiner — Richard M Camby
(74) Attorney, Agent, or Firm — WPAT Law P.C.; Anthony King

(57) ABSTRACT

An unmanned aerial vehicle's (UAV) take-off and landing platform. It includes a driving device, a bottom plate, a movable plate and a tractor. The tractor is connected to the front end of a bearing platform, and the tractor can drive the bearing platform to move; the bearing platform comprises the bottom plate and the movable plate. The movable plate has a first side plate, a second side plate and a third side plate. The first side plate and the second side plate are symmetrically arranged on both sides of the bottom plate, and the third side plate is arranged at the tail end of the bottom plate. The movable plate movably connects with the bottom plate and can move relative to the bottom plate with the drive of the driving device, so that the bearing platform can switch between the folded state and the unfolded state.

15 Claims, 2 Drawing Sheets

UAV TAKE-OFF AND LANDING PLATFORM

TECHNICAL FIELD

The application relates to the technical field of UAV, in particular a UAV take-off and landing platform.

BACKGROUND ART

With the rise of UAV industry, large UAVs are more and more widely used. Due to the increasing size and weight of the large UAV, it is impossible to complete the transportation of the large UAVs by manpower alone. Moreover, the tasks assigned by the UAV require high timeliness, and need to be completed within a limited time. Therefore, the preparation time before the UAV takes off is becoming less and less. Therefore, the UAV needs to take off at any time. In the prior art, the large UAV is usually transported to the take-off place by mechanical equipment such as trailer, and then transported to the hangar by mechanical equipment such as trailer after completing the flight mission. This operation is cumbersome, prolongs the flight preparation time, and reduces the work efficiency of UAV flight preparation.

Therefore, it is urgent to design a UAV take-off and landing platform to solve the above technical problems in the prior art.

SUMMARY OF THE APPLICATION

The purpose of the application is to propose a UAV take-off and landing platform, so as to solve the technical problems that the large UAV in the prior art is difficult to transport and the flight preparation operation process is cumbersome, thereby reducing the working efficiency of the UAV.

To this end, the application adopts the following technical solutions:

The application, which provides a UAV take-off and landing platform, comprising:

A driving device;

A bearing platform, which is used for bearing UAV;

A tractor, which is connected to the front end of the bearing platform and can drive the bearing platform to move;

The bearing platform comprises:

A bottom plate and a movable plate, the movable plate comprises a first side plate, a second side plate and a third side plate, the first side plate and the second side plate are symmetrically arranged on both sides of the bottom plate, and the third side plate is arranged at the tail end of the bottom plate;

The movable plates movably connects with the bottom plate, and can move relative to the bottom plate with the drive of the driving device, so that the bearing platform can switch between the folded state and the unfolded state.

The movable plate and the bottom plate are rotatably connected, when the movable plate is folded, the movable plate and the bottom plate form a bearing carriage vertically; when the movable plate is unfolded, the movable plate is folded outward to be in the same plane with the bottom plate.

The driving device comprises a hydraulic rod, and the first side plate, the second side plate and the third side plate are driven by a group of hydraulic rods to make the first side plate, the second side plate and the third side plate fold relative to the bottom plate. It also includes a first top plate, and the first side plate rotatably connects with the first top plate.

It also includes a second top plate, and the second side plate rotatably connects with the second top plate.

The first side plate, the second side plate and the third side plate can be raised and lowered relative to the bottom plate with the drive of the driving device;

When the movable plate is raised, the movable plate and the bottom plate form a bearing carriage vertically; when the movable plate is lowered, the upper end face of the movable plate and the upper end face of the bottom plate are in the same plane.

The movable plate is provided with a plurality of folding brackets. When the movable plate is folded along the bottom plate, the bracket can be opened to support the movable plate.

The lower side of the bottom plate is provided with a damping device.

The tractor comprises a headstock, in which a UAV control room and a cab are arranged. The control room of the UAV is provided with a movable plate folding and unfolding control device.

The beneficial effect of the application is that:

The movable plate in the application can move relative to the bottom plate with the drive of the driving device, so that the movable plate and the bottom plate are in the same horizontal plane, thus forming a UAV take-off and landing platform with a larger area, so as to meet the demand of large UAV for a large area platform during take-off and landing. The tractor can drive the movable plate and the bottom plate to move freely so that the large UAV can easily and quickly reach the takeoff point from the hangar without manual handling, which saves manpower, makes the operation process of flight preparation more convenient, and improves the work efficiency of large UAV when performing emergency tasks. After the large UAV lands back to the take-off and landing platform, the movable plate will be unfolded, and the tractor can quickly transport the UAV to the hangar, saving manpower and further improving the operation efficiency of the large UAV.

LEGENDS OF THE FIGS

1—driving device; 2—bottom plate;
3—tractor; 31—headstock; 311—UAV control room; 312—cab;
4—movable plate; 41—first side plate; 42—second side plate; 43—third side plate;
5—first top plate; 6—second top plate; 7—folding bracket; 8—damping device.

DETAILED DESCRIPTION

In order to make clearer the technical problems solved, the technical solution adopted and the technical effect achieved by the application, the technical solution of the embodiment of the application will be further described in detail below in combination with the attached figures.

In the description of the application, it should be noted that unless otherwise specified and limited, the terms, "connect", "connection", and "fixation" should be understood in a broad sense. For example, it can be fixedly connected, detachably connected, or integrated. It can be mechanical connection or electrical connection. It can be connected directly or indirectly through an intermediate medium, and it can be the connection between the two components. For those skilled in the art, the specific meaning of the above terms in the application can be understood in specific circumstances.

In the application, unless otherwise clearly specified and limited, the first feature "on" or "under" the second feature may include the direct contact between the first and second features, or the contact between the first and second features that is not direct contact, but through another feature between them. Moreover, the first feature "on", "over", and "above" the second feature may include the first feature directly above and obliquely above the second feature, or only indicates that the horizontal height of the first feature is higher than the second feature. The first feature "under", "below" and "beneath" the second feature, may include the first feature directly below and obliquely below the second feature, or only indicate that the horizontal height of the first feature is smaller than that of the second feature.

In the description of this embodiment, the terms "up", "down", "left", "right" and other orientation or position relationships are based on the orientation or position relationships shown in the attached figures, only for the convenience of description and simplified operation, rather than indicating or implying that the device or element must have a specific orientation, be constructed and operated in a specific orientation, so it cannot be understood as a limitation of the application. In addition, the terms "first" and "second" are only used to distinguish in description and have no special meaning.

Embodiment 1

Figure 1:
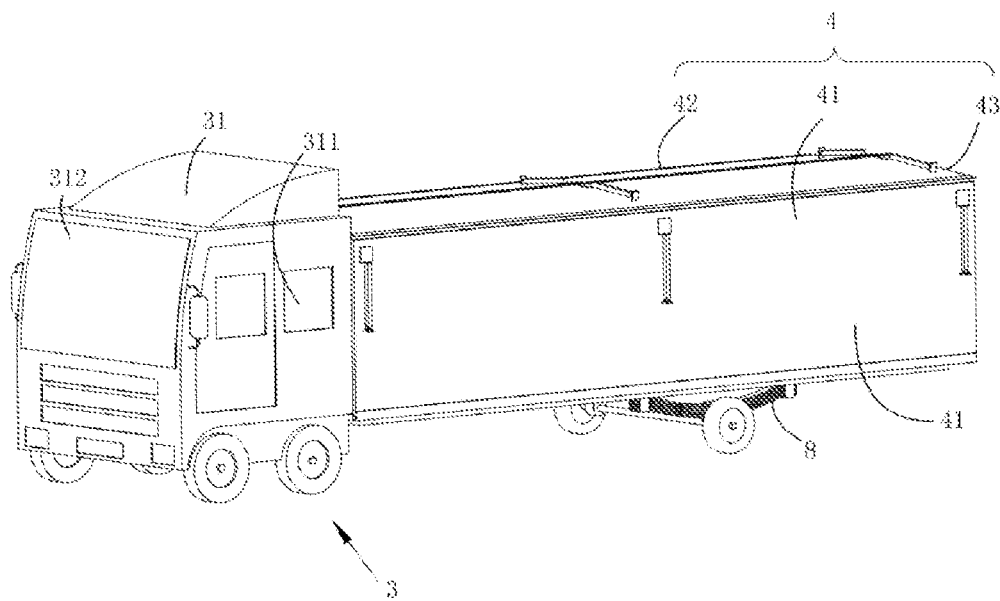
FIG. 1 is the structural diagram of the UAV take-off and landing platform provided by the embodiment of the application.
Figure 2:
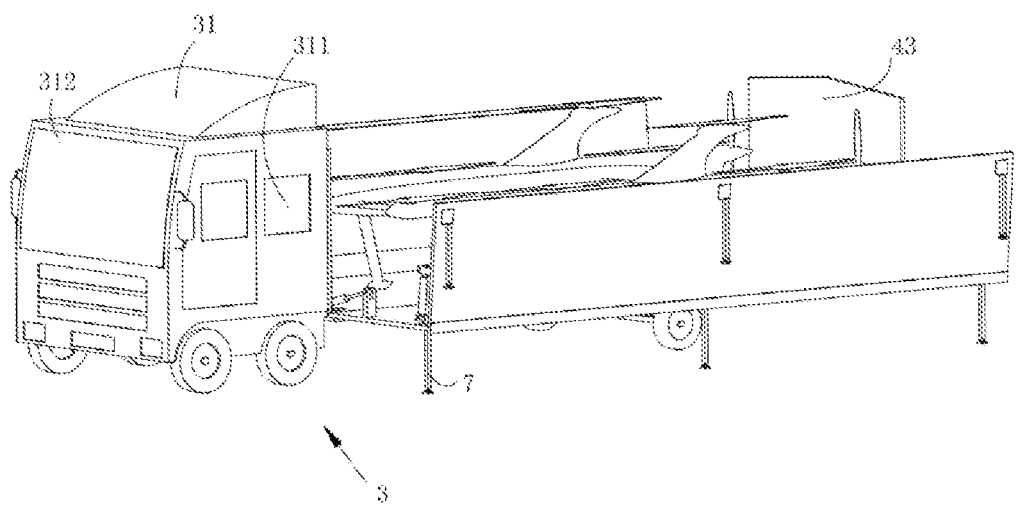
FIG. 2 is the structural diagram for the unfolding of the movable plate of the UAV take-off and landing platform provided by the embodiment of the application.
Figure 3:
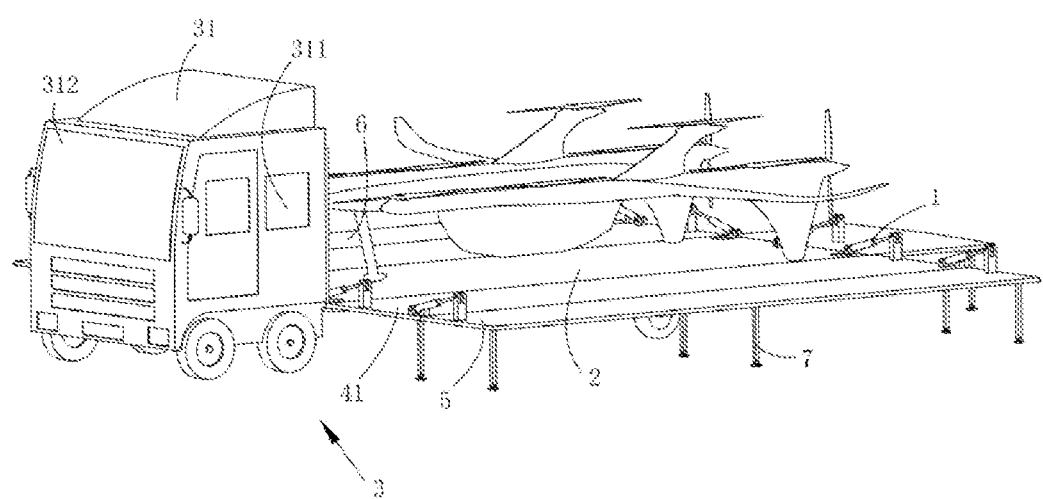
FIG. 3 is the structural diagram for the unfolding of the first top plate and the second top plate of the UAV take-off and landing platform provided by the embodiment of the application.

As shown in FIGS. 1-3, Embodiment 1 provides a UAV take-off and landing platform, including a driving device 1, a bearing platform and a tractor 3; the bearing platform is used to carry the UAV; The tractor 3 is connected to the front end of the bearing platform, and the tractor 3 can drive the bearing platform to move. The bearing platform comprises a bottom plate 2 and a movable plate 4, the movable plate 4 comprises a first side plate 41, a second side plate 42 and a third side plate 43, the first side plate 41 and the second side plate 42 are symmetrically arranged on both sides of the bottom plate 2, and the third side plate 43 is arranged at the tail end of the bottom plate 2; the movable plate 4 movably connects with the bottom plate 2, and can move relative to the bottom plate 2 with the drive of the driving device 1, so that the bearing platform can switch between the folded state and the unfolded state.

Exemplarily, the movable plate 4 and the bottom plate 2 are rotatably connected. When the movable plate 4 is folded, the movable plate 4 and the bottom plate 2 form a bearing carriage vertically; when the movable plate 4 is unfolded, the movable plate 4 is folded outward to be in the same plane with the bottom plate 2.

When the UAV needs to take off to perform tasks, the tractor 3 will transport the bottom plate 2 and movable plate 4 carrying the UAV from the hangar to the take-off place. Then, driven by the driving device 1, the first side plate 41, the second side plate 42 and the third side plate 43 can move outward along the bottom plate 2 at the same time, so that the movable plate 4 and the bottom plate 2 are in the same horizontal plane, that is, at this time, the movable plate 4 and the bottom plate 2 form a large UAV take-off and landing platform, and the user can quickly assemble the quick dismantling wings of the large UAV, that is, the preparation for flight of large UAV is completed, and then the takeoff is realized through the wireless remote control of UAV.

Further, after the UAV completes its flight mission and lands on the take-off and landing platform, the user only needs to disassemble the quick dismantling wings of the UAV, and then the movable plate 4 is folded, so that the first side plate 41, the second side plate 42, the third side plate 43 and the bottom plate 2 form a box for holding the UAV, and then the tractor 3 can quickly transport the UAV to another place or hangar for storage.

Compared with the prior art, the UAV take-off and landing platform in this embodiment can make the movable plate 4 move relative to the bottom plate 2 with the drive of the driving device 1, so as to form a larger take-off and landing platform. At the same time, it can quickly arrive at the take-off place through the transportation of the tractor 3, without manual handling of the UAV, which saves manpower, reduces the flight preparation time, and makes the operation process of flight preparation more convenient, thus improving the work efficiency of large UAV when it performs emergency tasks. When the UAV lands back to the landing platform, the tractor 3 can quickly transport the UAV to the hangar for storage, further improving the operation efficiency of the UAV.

As shown in FIG. 3, in this embodiment, the driving device 1 includes a hydraulic rod, and the first side plate 41, the second side plate 42 and the third side plate 43 are driven by a group of hydraulic rods to make the first side plate 41, the second side plate 42 and the third side plate 43 fold relative to the bottom plate 2.

Further, the fixed ends of each group of hydraulic rods are connected to the base plate 2, and the movable ends of each group of hydraulic rods are connected to the first side plate 41, the second side plate 42 and the third side plate 43, respectively, so that the first side plate 41, the second side plate 42 and the third side plate 43 can be folded along the base plate 2 under the action of the hydraulic rods, thereby forming a UAV take-off and landing platform with a larger area. In this way, when the movable plate 4 is folded and unfolded along the bottom plate 2, the hydraulic rod can offer certain protection to the movable plate 4, so that the movable plate 4 can be unfolded slowly to avoid damage due to the inertia of the movable plate 4. At the same time, each group of hydraulic rods is independent of each other. When a hydraulic rod has a drive failure, it will not affect the normal work of other hydraulic rods. Exemplarily, when the hydraulic rod that drives the first side plate 41 to fold along the bottom plate 2 fails, the second side plate 42 and the third side plate 43 can turn normally so that the second side plate 42 and the third side plate 43 are in the same plane with the bottom plate 2, which also facilitates the user to repair and replace the failed hydraulic rod on the bottom plate 2 in time.

Specifically, there are two hydraulic rods in a group, and the two hydraulic rods are arranged at both ends of the movable plate 4, respectively. When the first side plate 41, the second side plate 42 and the third side plate 43 are folded relative to the bottom plate 2, the two hydraulic rods arranged at both ends of the bottom plate 2, respectively, can balance the own weight of the movable plate 4 during the folding process, so that the two hydraulic rods can bear uniform force during the folding process of driving the movable plate 4, and extend the service life of each group of hydraulic rods.

As shown in FIG. 3, this embodiment also includes a first top plate 5 and a second top plate 6. The first side plate 41 is rotatably connected with the first top plate 5, and the second side plate 42 is rotatably connected with the second top plate 6. The first top plate 5 can rotate relative to the first side plate 41 driven by the hydraulic rod, and the second top plate 6 can rotate relative to the second side plate 42 driven by the hydraulic rod.

Further, by arranging the first top plate 5 and the second top plate 6, when the hydraulic rod drives the first top plate 5 and the second top plate 6 to rotate relative to the first side plate 41 and the second side plate 42, respectively, the first top plate 5 and the second top plate 6 can be in the same plane with the first side plate 41, the second side plate 42, the third side plate 43 and the bottom plate 2, thereby forming a UAV take-off and landing platform with a larger area and facilitating large UAVs of different sizes and models to take off and land on the take-off and landing platform. In addition, when the UAV lands back to the take-off and landing platform after completing the flight mission, the first top plate 5 and the second top plate 6 can be folded under the drive of the hydraulic rod to form a relatively closed space with the bottom plate 2 and the movable plate 4. This space is used to store and accommodate the UAV, so as to prevent the UAV from getting wet or exposed to the sun.

As shown in FIGS. 1-3, in this embodiment, the movable plate 4 is provided with a plurality of folding brackets 7. When the movable plate 4 is folded along the bottom plate 2, the folding brackets 7 can be opened to support the movable plate 4, and the lower side of the bottom plate 2 is provided with a damping device 8.

A plurality of folding brackets 7 are arranged on the movable plate 4, the first top plate 5 and the second top plate 6, so that during the unfolding of the movable plate 4, the folding brackets 7 can be opened at the same time, so that the folding bracket 7 can finally contact with the ground to support the movable plate 4, thereby avoiding the risk of instability of the take-off and landing platform caused by the unbalanced gravity of the movable plate 4. At the same time, the folding bracket 7 shares a part of the gravity of the movable plate 4 for the hydraulic rod, reducing the risk of damage to the hydraulic rod, thus ensuring the reliability of the take-off and landing platform and extending its service life.

Further, in order to reduce the impact of the UAV on the bottom plate 2 during take-off and landing, a damping device 8 is arranged below the bottom plate 2, so that the impact force generated by the UAV on the bottom plate 2 during take-off and landing can be transmitted to the damping device 8 through the bottom plate 2, thereby reducing the risk of damage to the bottom plate 2 by the impact force.

As shown in FIGS. 1-3, the tractor 3 in this embodiment includes a headstock 31, in which a UAV control room 311 and a cab 312 are arranged, and at the same time, a movable plate unfolding and folding control device is arranged in the UAV control room 311.

User drives the tractor 3 through the cab 312 in the headstock 31, thereby realizing any movement of the take-off and landing platform. The UAV control room 311 is provided with a console, which is connected with the movable plate unfolding and folding control device, and the movable plate unfolding and folding control device is wirelessly connected with the hydraulic rod.

When the user operates the console in the UAV control room 311, the console transmits the electrical signal to the movable plate unfolding and folding control device, which then transmits the signal to the hydraulic rod, so that the hydraulic rod drives the movable plate 4 to unfold or fold, so that the user can remotely control the UAV in the UAV control room 311 by operating the console to realize the takeoff and landing of the UAV, enabling the user to operate conveniently, saving manpower and further improving the efficiency of UAV preparation for flight and landing.

As shown in FIGS. 1-3, the tractor 3 in this embodiment also includes a hub, which is arranged under the headstock 31 and the bottom plate 2.

Exemplarily, two hubs with steering function are arranged in the direction of the headstock 31 away from the bottom plate 2, so that when the user operates the tractor 3, the tractor 3 can steer according to the takeoff destination. Two hubs are arranged under the headstock 31 and the bottom plate 2, respectively, to support the gravity of the headstock 31, the bottom plate 2 and the side plate, so as to ensure that the tractor 3 can run smoothly. It is worth noting that the user can reasonably optimize the number and arrangement position of wheel hubs according to the gravity of the headstock 31, the take-off and landing platform and the UAV. Therefore, such content will not be further described in this embodiment.

Embodiment 2

This embodiment provides a UAV take-off and landing platform, which is different from embodiment 1 in that the first side plate 41, the second side plate 42 and the third side plate 43 can slide downward relative to the bottom plate 2 with the drive of the driving device 1, so that the upper end face of the sliding movable plate 4 is in the same plane with the upper end face of the bottom plate 2.

When the first side plate 41, the second side plate 42 and the third side plate 43 slide relative to the bottom plate 2, the first side plate 41, the second side plate 42 and the third side plate 43 are all under the bottom plate 2, so that the bottom plate 2 can be used as the take-off and landing platform of the UAV. The user can realize the take-off and landing of the UAV on the take-off and landing platform through the wireless remote control of the UAV by assembling the quick dismantling main wing of the UAV. The first side plate 41, the second side plate 42 and the third side plate 43 slide relative to the bottom plate 2, thereby saving the space occupied by the movable plate 4, so that the UAV take-off and landing platform can realize the UAV's flight preparation work in a small space.

Other structures of this embodiment are the same as those of Embodiment 1, and will not be further described here.

The above contents are only the preferred embodiments of the application. For those skilled in the art, according to the idea of the application, there may be changes in the preferred embodiments and application scope. The contents of the specifications should not be understood as restrictions on the application.

The invention claimed is:

1. A UAV (unmanned aerial vehicle) take-off and landing platform, which is characterized in that the UAV take-off and landing platform comprises:
    a driving device (1);
    a bearing platform, which is used for bearing the UAV;
    a tractor (3), which is connected to the front end of the bearing platform and can drive the bearing platform to move;

the bearing platform comprising a bottom plate (2) and a movable plate (4);

the movable plate (4) comprising a first side plate (41), a second side plate (42) and a third side plate (43);

wherein the first side plate (41) and the second side plate (42) are symmetrically arranged on both sides of the bottom plate (2), and the third side plate (43) is arranged at the tail end of the bottom plate (2);

the movable plate (4) movably connects with the bottom plate (2), and can move relative to the bottom plate (2) under the drive of the driving device (1), so that the bearing platform can switch between the folded state and the unfolded state.

2. The UAV take-off and landing platform according to claim 1, which is characterized in that the movable plate (4) and the bottom plate (2) are rotatably connected;

when the movable plate (4) is folded, the movable plate (4) and the bottom plate (2) form a bearing carriage vertically; when the movable plate (4) is unfolded, the movable plate (4) is folded outward to be in the same plane with the bottom plate (2).

3. The UAV take-off and landing platform according to claim 2, which is characterized in that the driving device (1) comprises a hydraulic rod, and the first side plate (41), the second side plate (42) and the third side plate (43) are driven by a group of hydraulic rods to make the first side plate (41), the second side plate (42) and the third side plate (43) fold relative to the bottom plate (2).

4. The UAV take-off and landing platform according to claim 3, which is characterized in that it also comprises a first top plate (5), and the first top plate (5) rotatably connects with the first side plate (41).

5. The UAV take-off and landing platform according to claim 4, which is characterized in that it also comprises a second top plate (6), and the second top plate (6) is rotatably connected with the second side plate (42).

6. The UAV takeoff and landing platform according to claim 1, which is characterized in that the first side plate (41), the second side plate (42) and the third side plate (43) can be raised and lowered relative to the bottom plate (2) driven by the driving device (1); when the movable plate (4) is raised, the movable plate (4) and the bottom plate (2) form a bearing carriage vertically; when the movable plate (4) is lowered, the upper end face of the movable plate (4) and the upper end face of the bottom plate (2) are in the same plane.

7. The UAV take-off and landing platform according to claim 1, which is characterized in that a plurality of folding brackets (7) are arranged on the movable plate (4), and when the movable plate (4) is folded along the bottom plate (2), the bracket can be opened to support the movable plate (4).

8. The UAV take-off and landing platform according to claim 1, which is characterized in that the lower side of the bottom plate (2) is provided with a damping device (8).

9. The UAV take-off and landing platform according to claim 8, which is characterized in that the tractor (3) comprises a headstock (31), in which a UAV control room (311) and a cab (312) are arranged.

10. The UAV take-off and landing platform according to claim 9, which is characterized in that the UAV control room (311) is provided with a movable plate unfolding and folding control device.

11. The UAV take-off and landing platform according to claim 2, which is characterized in that a plurality of folding brackets (7) are arranged on the movable plate (4), and when the movable plate (4) is folded along the bottom plate (2), the bracket can be opened to support the movable plate (4).

12. The UAV take-off and landing platform according to claim 3, which is characterized in that a plurality of folding brackets (7) are arranged on the movable plate (4), and when the movable plate (4) is folded along the bottom plate (2), the bracket can be opened to support the movable plate (4).

13. The UAV take-off and landing platform according to claim 4, which is characterized in that a plurality of folding brackets (7) are arranged on the movable plate (4), and when the movable plate (4) is folded along the bottom plate (2), the bracket can be opened to support the movable plate (4).

14. The UAV take-off and landing platform according to claim 5, which is characterized in that a plurality of folding brackets (7) are arranged on the movable plate (4), and when the movable plate (4) is folded along the bottom plate (2), the bracket can be opened to support the movable plate (4).

15. The UAV take-off and landing platform according to claim 6, which is characterized in that a plurality of folding brackets (7) are arranged on the movable plate (4), and when the movable plate (4) is folded along the bottom plate (2), the bracket can be opened to support the movable plate (4).

\* \* \* \* \*